Nov. 1, 1960 G. S. ROGERS 2,958,551
RAILWAY JOURNAL BOX SEAL
Filed March 23, 1956 2 Sheets-Sheet 1
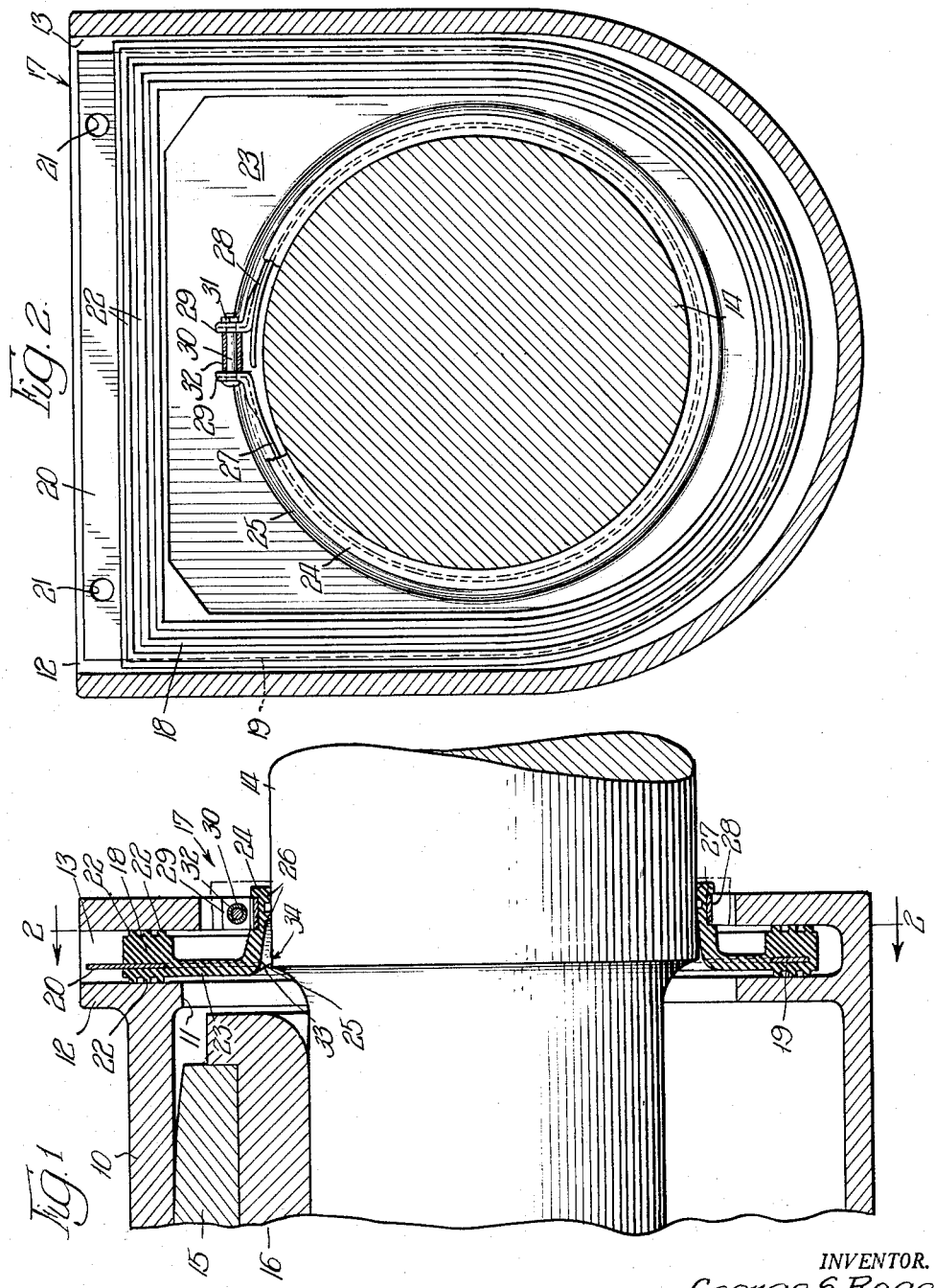
INVENTOR.
George S. Rogers,
BY
Cromwell, Greist & Warden
Attys.

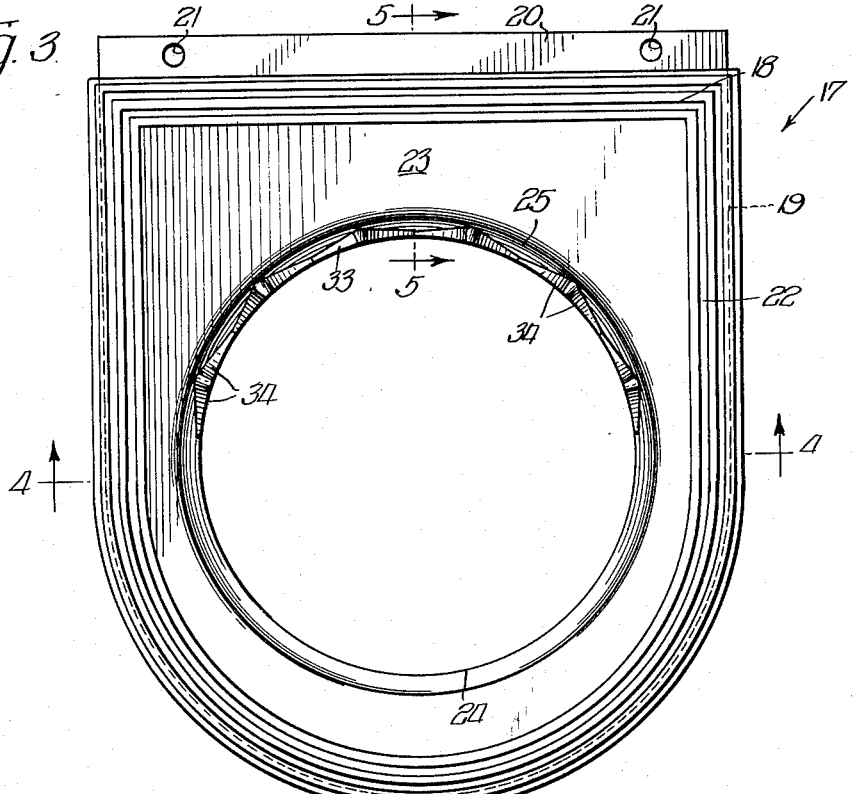
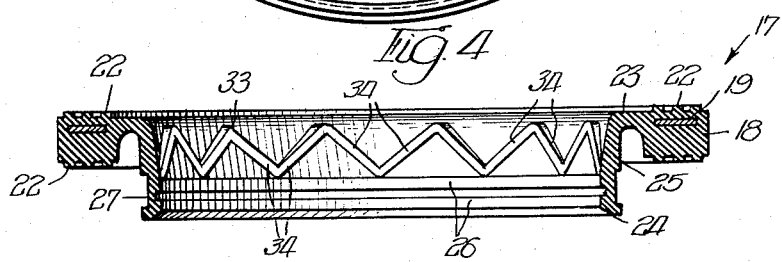
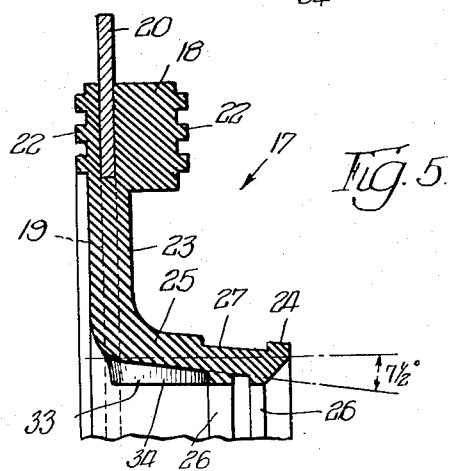

United States Patent Office 2,958,551
Patented Nov. 1, 1960

2,958,551

RAILWAY JOURNAL BOX SEAL

George S. Rogers, Hamilton, Ontario, Canada, assignor to Super Oil Seal Mfg. Co., Limited, Ontario, Canada, a corporation of Canada Filed Mar. 23, 1956, Ser. No. 573,423

1 Claim. (Cl. 286—6)

The present invention relates generally to an improved oil seal for use in a railway car journal box to retain lubricant within the journal box while at the same time prohibiting the entry thereinto of foreign material such as dirt.

It is an object of the present invention to provide an improved oil seal for mounting in the dust-guard slot of a conventional journal box, which seal may be readily installed or removed from the slot and which further is provided with adjustment means associated with its journal sealing portion capable of controlling and maintaining over extended operation, efficient sealing engagement between the sealing portion and the journal.

Another object is the provision of an oil seal of the type above described wherein the adjustment means associated with its journal sealing portion allows the latter to effectively cooperate with re-worked journals as well as new journals in the maintaining of efficient sealing action.

A further object is the provision of an oil seal of the type above described whose journal sealing portion is arranged with respect to a journal with which it is in sealing engagement to eliminate the trapping of lubricant between the sealing portion and the journal.

Still another object is to provide an oil seal having a sealing portion which is capable of returning lubricant injected between the sealing portion and the journal being sealed thereby into the sump of the journal box during the operation of the journal, the lubricant being injected between the sealing portion and the journal as a result of relative movement between elements maintained within the journal box, and the sealing portion being provided with means capable of efficiently eliminating the trapping of lubricant between the sealing portion and the journal while at the same time not interfering with the flexibility of the sealing portion for the maintenance of an effective seal during relative radial movement of the journal with respect to the mounting portion of the seal to which the sealing portion is attached.

Other objects not specifically set forth will become apparent from the following detailed description made in conjunction with the drawings wherein:

Fig. 1 is a fragmentary vertical section of a known type of journal box and associated journal having the improved oil seal of the present invention mounted therein;

Fig. 2 is an elevation in partial section of the journal box and seal of Fig. 1 taken along line 2—2 of Fig. 1;

Fig. 3 is a view in elevation of the improved oil seal of the present invention;

Fig. 4 is a sectional view of the oil seal of Fig. 3 taken along line 4—4 of Fig. 3; and Fig. 5 is a fragmentary vertical section of a portion of the oil seal of Fig. 3 taken along line 5—5 of Fig. 3.

In Figs. 1 and 2 a journal box 10 of known design is shown as including an end opening 11 of oblong shape being provided with an outwardly directed flange portion 12 which defines an inwardly opening dust-guard slot 13 of U-shape cross section. The top horizontal section of the dust-guard slot 13 is provided with an upwardly directed opening for access thereinto. Through the opening 11 of the journal box 10 is inserted a journal 14 of known design and of a diameter appreciably less than that of the opening 11 to allow radial movement thereof within the opening. The journal box 10 is further provided with a wedge plate 15 and a bearing plate 16 which cooperate between the journal box 10 and the journal 14 in a known manner.

An oil seal 17 formed from resilient material, such as high grade synthetic rubber, is illustrated as having a body or mounting portion 18 which is of substantial mass and rectangular shape extending circumferentially continuously within the dust-guard slot 13. The body portion 18 substantially fills the dust-guard slot 13 and is provided with two side walls and an integral bottom of U-shaped outline, the side walls being closed at the top with a horizontally extending top portion. The body portion 18 is internally supported by an imbedded metal plate 19 which, in turn, is provided with an upwardly extending exposed horizontal band 20 having spaced holes 21 therein. The plate 19 provides the resilient material of the body portion 18 with a required amount of rigidity to allow the seal 17 to be easily installed and removed. The band 20 is provided as a means for grasping the seal for removal from the slot 13 and the holes 21 may be engaged by a hook or the like in carrying out such a removal.

The body portion 18 is further provided with radially extending circumferentially continuous, concentrically spaced lips 22 on opposite side walls thereof. The lips 22 are defined by intermediate grooves and extend into sealing engagement with the opposed inner surfaces of the side walls of the slot 13.

Extending radially inwardly from the inner surface of the body portion 18 and integral therewith is a connecting web 23. This web is circumferentially continuous and supports centrally thereof an integral journal sealing portion 24 which is positioned in a direction radially outwardly of the journal box 10 coaxial with and about the outer periphery of the journal 14 in sealing engagement therewith. Intermediate the web 23 and the sealing portion 24 and integrally interconnecting the same is a journal sleeve portion 25 which is angled inwardly toward the journal 14 having its innermost surface positioned at an outwardly directed angle with respect to the outer periphery of the journal 14. The sleeve 25 and web 23 are relatively thin and highly flexible and allow the journal 14 to move without restriction in any direction in its usual manner while at the same time enabling the journal sealing portion 24 to remain in effective sealing engagement with the outer periphery of the journal 14 thereby keeping the lubricant in the journal box 10 and eliminating the introduction of dust, dirt and water thereinto. The radial length of the connecting web 23 provides a sufficient quantity of connecting web material to allow for the radial movement of the journal 14 within the opening 11.

The journal sealing portion 24 is provided with circumferentially continuous, inwardly directed, concentrically spaced sealing lips 26 which engage the outer periphery of the journal 14. The top surface of the sealing portion 24 is provided with an inwardly directed, circumferentially continuous groove 27 for receiving a clamp ring 28. This ring is provided with spaced ends defined by upwardly extending lugs 29 which receive therethrough a clamp screw 30 threaded at one end thereof into a shakeproof nut 31. Intermediate the lugs 29 the screw 30 carries a sleeve spacer 32 preferably of a non-corrosive nature such as fiber or non-ferrous material, which spacer limits the tightening of the clamp ring 28 about the sealing portion 24 thereby limiting the sealing pressure applied against the outer periphery of the journal 14.

The use of the clamp ring 28 allows the sealing pressure maintained between the lips 26 and the journal 14 to be regulated to any desired extent and upon regulation insures uniform contact between the lips 26 and that portion of the journal 14 in sealing engagement therewith. Continued maintenance of desired sealing engagement pressure is assured by providing the clamp screw 30 with the shake-proof nut 31. The provision of the spacer 32 prohibits the clamp ring 28 from being tightened to an extent that the sealing portion 24 becomes frozen on the journal 14.

The clamp ring 28 has an additional important function. During the course of continued operation of railway cars it is often necessary to re-work the journals which results in a slight reduction in their outside diameters. The seal 17 is capable of use not only with new journals but also with re-worked journals as the clamp ring 28 may be tightened to an extent that the lips 26 will be brought into proper sealing engagement with a re-worked surface of a journal. Under such circumstances it is merely necessary to utilize a spacer 32 of reduced length to allow the lugs 29 to be brought together by the clamp screw 30 and nut 31 to an extent that proper sealing engagement between the lips 26 and the re-worked journal 14 is accomplished. For this purpose a number of spacers of different lengths may be kept on hand. It has been found preferable to insulate the outer surface of the clamp ring 28 as well as the clamp screw 30 and the nut 31 in any suitable manner, such as with a phosphate coating, to prevent any possibility of sparking should the ring 28 or its associated parts come into moving contact with steel parts.

During operation of the journal, lubricant is often forced in between the seal and the journal by an oiler, if one is used, or by relative movement between the bearing plate 16 and the journal 14. The journal 14 is capable of moving longitudinally and radially to a certain extent and the rubbing action created between the journal and the bearing plate 16 causes lubricant to be forced or squirted in between the seal and the journal. If no provisions are made for the return of lubricant forced between the seal and the journal, the lubricant may be trapped between these members and ultimately work its way through the sealing portion 24 outwardly of the journal box 10. Leakage of this nature is undesirable and where the lubricant is what is commonly referred to as dope, namely, oil impregnated fiber waste, the trapping of dope with its fiber content may ultimately lead to the creation of a permanent separation between the sealing portion 24 and the journal 14.

To overcome this problem the intermediate sleeve portion 25 is provided with an inner surface which is angled away from the journal 14. As a result of this arrangement lubricant which is forced between the sleeve 25 and the journal 14 is not trapped because of close association between the sleeve 25 and the journal 14, but due to the incline of the inner surface of the sleeve 25 away from the outer periphery of the journal 14 the lubricant is free to flow back into the sump of the journal box 10 at the lower part of the seal 17. The bearing plate 16 does not extend about the entire periphery of the journal 14 but normally describes an arc of approximately 120° about the journal. Consequently, the forcing of lubricant between the seal and the journal as a result of relative movement between the bearing plate 16 and the journal 14 occurs only along the 120° arc defining the contact between bearing plate 16 and journal 14. Due to the inclination of the sleeve 25, lubricant which is forced between the seal and the journal throughout the 120° arc may return to the sump by flowing downwardly about the opposed surfaces of the sleeve 25 and the journal 14 and eventually out of association therewith by reason of the outward inclination of the lower portion of the inner surface of the sleeve.

To further aid the removal of lubricant forced between the sleeve 25 and the journal 14 and to particularly aid in the removal of dope which, due to its nature, is not free flowing, the inner surface of the sleeve 25 is provided with wiping elements 33 integral therewith and designed to be maintained in engagement with the outer periphery of the journal 14. As shown in Fig. 3 the wiping elements 33 are formed about the upper portion of the inner surface of the sleeve 25 and describe an arc of 160°. It should be understood that the wiping elements may be provided about the entire inner periphery of the sleeve 25; however, it has been found that adequate wiping action may be obtained by merely positioning the elements adjacent the bearing plate. As the bearing plate 16 is responsible for forcing the greatest quantities of lubricant between the seal and the journal, the provision of wiping elements 33 describing an arc of 160°, which is greater than the arc of 120° described by the bearing plate 16, will function efficiently to wipe the journal 14 free of lubricant which normally could be trapped between the seal and the journal but for the outward inclination of the inner surface of the sleeve 25. The wiping edges of the elements 33 hasten the removal of dope or lubricant forced between the seal and the journal and, as a result, any possibility of lubricant leakage through the sealing portion 24 is eliminated.

As particularly shown in Fig. 4, the wiping elements 33 are formed from a series of fingers 34 which are formed integral with the inner surface of the intermediate sleeve 25 and which are integrally connected with one another being spaced at right angles therebetween. The angularity between the fingers 34 may be varied as, for example, it has been found that a finger angularity of 45° promotes highly efficient wiping action. The V-shaped finger arrangement utilizes but a small portion of the total surface area of the inner surface of the sleeve 25 and, as a result, the flexibility of the sleeve 25 is not appreciably reduced and lubricant is efficiently moved in a direction away from the sealing portion 24. This feature is of particular importance in that the ability of the sealing portion 24 to follow the journal 14 in its relative movement with respect to the seal 17 is necessary in order to maintain an efficient sealing relation. By providing the thin circumferentially extending wiping fingers 34 while utilizing but a small fraction of the total surface area of the inner surface of the sleeve 25, the flexibility of the sealing portion 24 with respect to the body portion 18 of the seal 17 is maintained and highly efficient sealing action is provided.

Referring particularly to Figs. 3 and 5, it will be noted that the innermost surfaces of the wiping fingers 34 extend coaxial with the journal 14 and in order to bring this about the fingers 34 increase in radial thickness in a direction away from the sealing portion 24 to compensate for the outward inclination of the inner surface of the sleeve 25. It has been found preferable to form the sleeve 25 with an outward slope with respect to the sealing portion 24 of approximately 7½°. The 7½° slope with respect to the horizontal is adequate to promote the return of free flowing lubricant thrown or otherwise introduced in between the sleeve 25 and the journal 14 back into the sump of the journal box 10 solely as a result of gravity attraction. In manufacturing the seal 17, the provision of an outward inclination of 7½° to the inner surface of the sleeve 25 will provide for a mounted angularity of approximately 6° when the seal is placed in its operative position with respect to a journal. An operating angularity of 6° has been found to be completely adequate for the purposes disclosed.

From the foregoing it can be readily seen that the railway journal box oil seal of the present invention exhibits many desirable features. Over and above the ability of the seal to return lubricant injected between the seal and the journal to the sump, the positioning of the sealing portion 24 radially outwardly of the opening 11 of the journal box 10 makes the seal highly accessible for adjustment. During the use of the seal 17 the effectiveness of the sealing portion 24 may be continuously regulated by appropriate adjustment of the clamp ring 28 and such may be accomplished without requiring the disassembling of any portion of the total unit. To remove the journal 14 from the journal box 10 it is necessary merely to loosen the clamp ring 28 which may be easily done due to the accessibility of the clamp screw 30.

The clamp ring 28 has been found to be fully capable of retaining the sealing portion 24 in circumferentially continuous sealing contact with the journal 14. During extensive operation of the seal 17 the clamping ring 28 does not become permanently distorted as a result of relative movement of the journal 14 with respect to the journal box 10. As a result, complete sealing contact is continuously maintained and lubricant leakage is eliminated.

Obviously many modifications and variations of the invention as hereinbefore set forth may be made without departing from the spirit and scope thereof, and therefore only such limitations should be imposed as are indicated in the appended claim.

I claim:

For use in a journal box having a journal extending thereinto through an opening in an end thereof, the opening being surrounded by an inwardly opening dust-guard slot, and a bearing plate in the box in engagement with the journal throughout an arc of approximately 120° inwardly of the slot, an oil seal having a circumferentially continuous body portion adapted to be mounted within a dust-guard slot in sealing engagement with opposed inner surfaces of said slot, a journal sealing portion positioned centrally of said body portion and axially offset relative thereto to extend into a journal box opening in a direction outwardly of said box, said journal sealing portion adapted to be received about a journal and including a continuous lip for sealing engagement with said journal, an adjustable clamp means received about said journal sealing portion for holding said lip in engagement with a journal, and a circumferentially continuous flexible connecting web portion integral with the innermost margin of said body portion and the rear margin of said journal sealing portion to connect the same and allow relative movement therebetween, the entire web portion immediately adjacent said journal sealing portion extending axially rearwardly of said journal sealing portion and being inclined radially outwardly therefrom to prevent trapping of lubricant between the web portion and a journal, the inner inclined surface of said web portion having integrally formed therewith a continuous series of V-shaped wipers extending entirely across the width of said web portion and projecting inwardly for engagement with a journal, each of said wipers being of increasing radial thickness in a direction away from said journal sealing portion to compensate for the inclination of said web portion and to maintain the inner surfaces of said wipers in engagement with a journal, said wipers being formed with said web portion solely throughout an arc of approximately 160° for juxtapositioning relative to a bearing plate.

References Cited in the file of this patent

UNITED STATES PATENTS

| 1,811,588 | Moreau | June 23, 1931 |
| 1,995,813 | Olson | Mar. 26, 1935 |
| 2,188,857 | Chievitz | Jan. 30, 1940 |
| 2,297,021 | Parker | Sept. 29, 1942 |
| 2,758,853 | Beck | Aug. 14, 1950 |

FOREIGN PATENTS

| 12,943 | Great Britain | of 1912 |
| 4,825 | Australia | Nov. 6, 1931 |